(12) United States Patent
Elmasry

(10) Patent No.: US 6,348,432 B1
(45) Date of Patent: Feb. 19, 2002

(54) HEAT SENSITIVE COATING, RECORDING MATERIAL AND METHODS OF MANUFACTURE

(75) Inventor: Mohamed Elmasry, Nashua, NH (US)

(73) Assignee: Nashua Corporation, Nashua, NH (US)

( * ) Notice: Subject to any disclaimer, the term of this patent is extended or adjusted under 35 U.S.C. 154(b) by 0 days.

(21) Appl. No.: 09/522,730

(22) Filed: Mar. 10, 2000

Related U.S. Application Data

(60) Provisional application No. 60/124,050, filed on Mar. 12, 1999.

(51) Int. Cl.⁷ ................................................ B41M 5/30
(52) U.S. Cl. ................. 503/201; 503/209; 503/213; 503/217; 503/218; 503/221; 503/224; 526/329.7
(58) Field of Search ................................. 503/213, 201, 503/209, 216, 217, 218, 221, 224; 526/329.7

(56) References Cited

U.S. PATENT DOCUMENTS

| | | | |
|---|---|---|---|
| 3,833,384 A | 9/1974 | Noonan et al. ............ 96/115 P |
| 4,177,177 A | 12/1979 | Vanderhoff et al. ........... 260/29 |
| 4,898,787 A | 2/1990 | Min et al. ................... 428/480 |
| 5,070,164 A | 12/1991 | Min et al. ................... 526/286 |
| 5,093,194 A | 3/1992 | Touhsaent et al. .......... 428/349 |
| 5,134,189 A | 7/1992 | Matsushita et al. ......... 524/549 |

FOREIGN PATENT DOCUMENTS

| | | | |
|---|---|---|---|
| DE | 40 02 655 | 12/1991 | ............ B41M/5/30 |
| JP | 55 028805 | 2/1980 | ............ B41M/5/18 |
| JP | 63 035384 | 2/1988 | ............ B41M/5/18 |

*Primary Examiner*—Bruce H. Hess
(74) *Attorney, Agent, or Firm*—Testa, Hurwitz & Thibeault, LLP

(57) ABSTRACT

Disclosed are heat sensitive coatings and record materials that are environmentally resistant and therefore do not require a protective coating. One embodiment includes an environmentally resistant heat sensitive coating that includes an acrylate polymer of the formula:

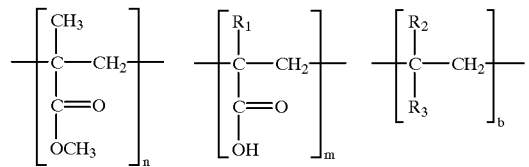

wherein $R_1$ is a hydrogen or a methyl group, $R_2$ is a hydrogen or a methyl group, and $R_3$ is nitrile or chlorine or

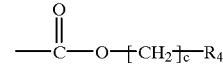

wherein, when c is 0, $R_4$ is methyl, phenyl, or substituted phenyl, and when c is greater than 0, $R_4$ is methyl, phenyl, substituted phenyl, halogen, nitrile or hydroxyl; m is greater than 1; n is greater than 1; b is greater than or equal to 0; and c is an integer from 0 to 38.

30 Claims, No Drawings

HEAT SENSITIVE COATING, RECORDING MATERIAL AND METHODS OF MANUFACTURE

RELATED APPLICATION

This application claims the benefit of copending U.S. Provisional Patent Application Ser. No. 60/124,050 filed Mar. 12, 1999, the entire disclosure of which is incorporated by reference herein.

FIELD OF THE INVENTION

The invention relates generally to heat sensitive coatings. More specifically, the invention relates to heat sensitive coatings which do not require a protective coating.

BACKGROUND OF THE INVENTION

Generally, heat sensitive recording materials include a color producing or heat sensitive layer coated onto a substrate with a protective layer coated over the heat sensitive coating to protect it from exposure to water and/or oils.

Typical heat sensitive coatings are aqueous dispersions of a color former, a color developer, an optional organic sensitizer and a water soluble polymeric binder. The polymeric binder, e.g., polyvinyl alcohol, polyvinylpyrrolidone, or the like, typically is highly soluble in water. Accordingly, heat sensitive layers which contain water soluble polymers, like polyvinyl alcohol, have a high affinity for water such that the resulting recording material may be easily damaged by the presence of moisture. In addition, organic sensitizers and bisphenol-type developers in typical heat sensitive coatings often are soluble in oil such that contact between the recording material and an oil may result in reversal of an image formed by development at the area of contact.

Protective coatings generally include water soluble polymer binders such as, for example, polyvinyl alcohol crosslinked with a crosslinker such as, for example, melamine-formaldehyde. These top coat layers tend to reduce the incidence of damage to the recording material by water and/or oil, however, they do not protect the recording material from prolonged exposure to water.

The use of a protective coating also increases the cost of the heat sensitive recording material, for example, the costs of the protective coating materials and the processing costs involved in preparing and coating the protective coating are added to the overall costs of the commercial product. Moreover, protective coatings typically reduce the tint strength of the heat sensitive layer due to increased spacing between the thermal head of the thermal printer and the color producing layer when printing. Additionally, protective layers typically include a plastic binder and/or fillers comprising pigment. Plastic binders typically are heat insulating which further reduces the potential tint strength and pigments which tend to mask the developed color of the heat sensitive layer.

SUMMARY OF THE INVENTION

A heat sensitive coating has been developed which is environmentally resistant. That is, the heat sensitive coating is resistant to water, oil, cleaning solutions and plasticizers, as well as other environmental stresses including scuffing and scratching, thus obviating the necessity and expense of a protective coating. The heat sensitive coating and recording materials of the present invention may be used with a variety of printers and processes, including, but not limited to, offset and flexo printing.

An environmentally resistant heat sensitive coating of the present invention includes an acrylate polymer of the formula:

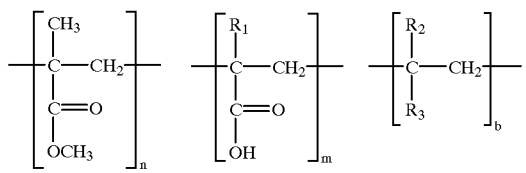

wherein $R_1$ is a hydrogen or a methyl group; $R_2$ is a hydrogen or a methyl group; and $R_3$ is nitrile or chlorine or

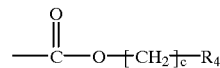

wherein, when c is 0, $R_4$ is methyl, phenyl, or substituted phenyl, and when c is greater than 0, $R_4$ is methyl, phenyl, substituted phenyl, halogen, nitrile or hydroxyl; m is greater than 1; n is greater than 1; b is greater than or equal to 0; and c is an integer from 0 to 38.

In one embodiment of the present invention, the acrylate polymer is soluble in an alkaline aqueous solution. In another embodiment, the acrylate polymer is a methylmethacrylate/ethylacrylate/methacrylic acid polymer, a methylmethacrylate/n-butylmethacrylate/methacrylic acid polymer, a methylmethacrylate/methylacrylate/methacrylic acid polymer, a methylmethacrylate/hydroxyethylmethacrylate/methacrylic acid polymer, a methylmethacrylate/hydroxypropylmethacrylate/methacrylic acid polymer, or a methylmethacrylate/propylacrylate/methacrylic acid polymer.

In another embodiment, an organic sensitizer is included with the acrylate polymer. Suitable sensitizers include, but are not limited to, polyaromatic waxes, methylbenzyl oxalates, for example, di-p-methylbenzyl oxalate, terphenyls, for example p-terphenyl, benzobiphenyls, fatty acids, fatty acid esters, for example, stearate, fatty amides, for example, stearamide, fatty acid salts, polyethylene waxes, dimethylphenyl ethane, for example, 1,2 bis(3,4-dimethylphenyl)ethane, carnauba waxes, microcrystalline waxes, and carboxy-modified paraffin waxes.

Optionally, the present invention may include a crosslinking agent. Preferably, the crosslinking agent is one that is suitable for use with polymers containing functional carboxylic acid groups. Suitable crosslinking agents include, for example, aziridine, epichlorohydrine, zinc oxide, and ammonium zirconium carbonate.

In yet another embodiment, a heat sensitive coating of the present invention may include a color former. Suitable color formers include fluorans, thiofluoranes, spiropyrans, triarylmethanes, xanthenes, and methynes.

In a further embodiment, the present invention may include a color developer. Suitable color developers include 4,4'-isopropylidenediphenol, 4,4"-diphenolsulfoxide, benzyl p-hydroxybenzoate, and phenol oligomers.

Optionally, the present invention may further include a filler selected from the group consisting of silica, zinc oxide, aluminum hydroxide, kaolin clay, talc, calcium carbonate, nylon powder, and polyethylene powder.

Another aspect of the present invention is a recording material which includes a heat sensitive coating of the present invention.

Yet another aspect of the present invention is a method of making an environmentally resistant heat sensitive recording which includes the following steps: (a) providing a heat sensitive coating comprising an acrylate polymer of the formula:

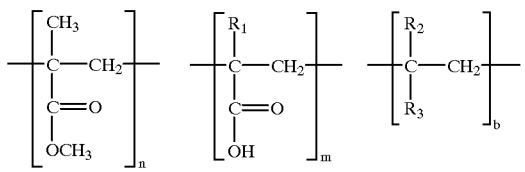

wherein $R_1$ is a hydrogen or a methyl group; $R_2$ is a hydrogen or a methyl group; and $R_3$ is nitrile or chlorine or

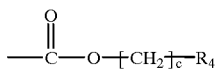

wherein, when c is 0, $R_4$ is methyl, phenyl, or substituted phenyl, and when c is greater than 0, $R_4$ is methyl, phenyl, substituted phenyl, halogen, nitrile or hydroxyl; m is greater than 1; n is greater than 1; b is greater than or equal to 0; and c is an integer from 0 to 38; (b) coating a substrate with the heat sensitive coating; and (c) thermally activating the heat sensitive coating.

The invention will be understood further upon consideration of the following description.

DETAILED DESCRIPTION OF THE INVENTION

An environmentally resistant heat sensitive coating has been developed. That is, the heat sensitive coating is resistant to water, oil, cleaning solutions and plasticizers, as well as other environmental stresses including scuffing and scratching, thus obviating the necessity and expense of a protective coating.

Generally, the invention disclosed herein includes an environmentally resistant heat sensitive coating including an acrylate polymer of the formula:

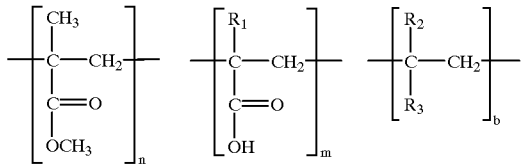

wherein $R_1$ is a hydrogen or a methyl group; $R_2$ is a hydrogen or a methyl group; and $R_3$ is nitrile or chlorine or

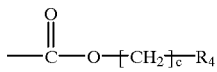

wherein, when c is 0, $R_4$ is methyl, phenyl, or substituted phenyl, and when c is greater than 0, $R_4$ is methyl, phenyl, substituted phenyl, halogen, nitrile or hydroxyl; m is greater than 1; n is greater than 1; b is greater than or equal to 0; and c is an integer from 0to 38.

In one embodiment of the invention, the acrylate polymer is soluble in an alkaline aqueous solution. This solubility is due in part to the presence of carboxylic acid groups, which are neutralized in alkaline aqueous solutions. Without wishing to be bound to any particular theory, it is believed that the acrylate polymers of the present invention, being not readily soluble in neutral and acidic water, increase the resistance of the coating to water damage. Preferably, the acrylate polymer also has a glass transition temperature (Tg) equal to or greater than about 100° C.

One polymer suitable for use in accordance with the present invention is methylmethacrylate/ethylacrylate/methacrylic acid. This polymer has a glass transition temperature (Tg) of about 100° C., an average molecular weight of about 60,000, an acid number of about 120, and is soluble in an alkaline aqueous solution. This polymer is commercially available under the trade name Elvacite™-2669 from ICI Co. (Memphis, Tenn.).

Another suitable polymer is methylmethacrylate/n-butylmethacrylate/ methacrylic acid with a weight ratio of approximately 70/5/25 respectively. Other acrylate polymers suitable for use in accordance with the present invention include methylmethacrylate/methylacrylate/methacrylic acid polymers, methylmethacrylate/hydroxyethylmethacrylate/methacrylic acid polymers, methylmethacrylate/hydroxypropylmethacrylate/methacrylic acid polymers, and methylmethacrylate/propylacrylate/methacrylic acid polymers Methods of making acrylate polymers by homogeneous free-radical polymerization such as bulk, solution and suspension polymerization are well known to those skilled in the art.

In another embodiment of the invention, the heat sensitive coating further includes an organic sensitizer. Without wishing to be bound to any particular theory, it is believed that when the heat sensitive coating is thermally activated to form an image, the acrylate polymer in the presence of the organic sensitizer produces a change in the coating which results in a further improvement in the resistance of the coating and recording material to water, oils and plasticizers.

Suitable organic sensitizers have a melting temperature of between about 50° C. and about 200° C. and are capable of facilitating the dissolution of the color former and the color developing material during the thermal activation of the heat sensitive layer.

Suitable sensitizers include, but are not limited to, polyaromatic waxes, methylbenzyl oxalates, for example, di-p-methylbenzyl oxalate, terphenyls, for example p-terphenyl, benzobiphenyls, fatty acids, fatty acid esters, for example, stearate, fatty amides, for example, stearamide, fatty acid salts, polyethylene waxes, dimethylphenyl ethane, for example, 1,2 bis(3,4-dimethylphenyl)ethane, carnauba waxes, microcrystalline waxes, and carboxy-modified paraffin waxes. Suitable stearamide is commercially available, for example, from Witco Co. (Greenwich, Conn.). 1,2 bis (3,4-dimethylphenyl)ethane, suitable for use in accordance with the present invention is available, for example, under the trade name ADK ARKLS Y-7 from Adeka (Tokyo, Japan). Similarly, suitable di-p-methylbenzyl oxalate is commercially available from DIC (Tokyo, Japan) and p-terphenyl is available from Aldrich (Milwaukee, Wis.).

The heat sensitive coating of the present invention may include a color former, including any leuco dye customarily employed in heat sensitive coatings. For example, fluoran, thiofluorane, spiropyran, triarylmethane, xanthene, and methyne, among others, are suitable for use with the present invention.

The heat sensitive coating may further include any developer used in heat sensitive coatings. Such developers are well known to those skilled in the art and include, for example, 4,4'-isopropylidenediphenol, 4,4'-diphenolsulfoxide, benzyl p-hydroxybenzoate, and phenol oligomers.

Also suitable for use with the invention are crosslinking agents. Preferably, the crosslinking agent is suitable for use with polymers containing functional carboxylic acid groups, such as, for example, aziridine, epichlorohydrine, zinc oxide, and ammonium zirconium carbonate.

The heat sensitive coating may further include various additives for heat sensitive coatings. For example, an organic or inorganic filler such as, for example, silica, zinc oxide, aluminum hydroxide, kaolin, clay, talc, calcium carbonate, nylon powder and polyethylene powder may be used in accordance with the invention. In particular, the addition of aluminum hydroxide and/or calcium carbonate is preferred as it improves the water resistance of the heat sensitive coating.

The invention also may include additional additives including, but not limited to, biocides, dispersants, wetting agents and defoamers. Such additives are typically application-specific and are well known in the art.

Suitable substrates for use with the invention include, but are not limited to, paper, cardboard, foam core, fabric, and plastic films like polyethylene terephthalate film, commonly known as Mylar, polyextruded photobase paper, and polyethylene film. Accordingly, suitable substrates may be opaque, translucent or clear.

The present invention also includes an environmentally resistant heat sensitive recording material that includes a substrate and a heat sensitive layer as described above.

Optionally, the recording material of the present invention may include further coatings including intermediate coatings disposed between the substrate and the heat sensitive coating, coatings disposed on the heat sensitive coating but not substantially contacting the substrate, and/or coatings disposed on the other side of the substrate opposite the heat sensitive coating. These optional coatings may be used for a variety of purposes, including, for example, to reduce curl, to create decorative effects and/or to create an adhesive layer for use as, for example, labels. Such coatings are well known in the art.

The heat sensitive coatings of the present invention generally exhibit improved adhesion to plastic substrates and other non-cellulosic substrates, thus obviating the need for an adhesion coating disposed between the plastic substrate and the heat sensitive coating. These intermediate adhesion coatings, sometimes referred to as tie-coats, typically are necessary with conventional coatings, especially for use with non-cellulosic substrates. Because the heat sensitive coatings of the present invention do not require an intermediate adhesive layer, cost savings as well as simplification of the process to produce the recording material of the present invention may be realized.

A heat sensitive coating of the present invention may be prepared by uniformly dispersing the components in water. The heat sensitive coating then may be applied to a substrate using a variety of techniques well known in the art for coating substrates, including, coating with a wire bar.

The recording material of the present invention is suitable for any conventional use for recording materials including tickets, for example, airline, railroad, concert and lottery tickets, and for labels, including supermarket and medical labels. Further, the heat sensitive coating and recording material of the present invention may be used with a variety of printers and processes, including, but not limited to, offset and flexo printing.

Practice of the invention will be more fully understood from the following examples, which are presented herein for illustration only and should not be construed as limiting the invention in any way. Part and percentages used herein are by weight.

EXAMPLE 1

Coating and Record Material with
Methylmethacrylate/Ethylacrylate/Methacrylic Acid
Polymer and Stearamide Sensitizer A 15% solution of Elvacite™-2669 methylmethacrylate/ethylacrylate/methacrylic acid polymer in water was prepared by blending 8 grams of concentrated (25%) ammonia solution and 275 grams of water, then dissolving 50 grams of the polymer into the solution. The methylmethacrylate/ethylacrylate/methacrylic acid polymer was Elvacite™-2669 methylmethacrylate/ethylacrylate/methacrylic acid polymer obtained from ICI Co. (Memphis, Tenn.).

Preparation of Dispersion A

A first dispersion was prepared by dispersing 11 parts of the above polymer solution with 46.12 parts Kemamide™-S stearamide, and 103.73 parts 4-hydroxy-4-isopropoxydiphenylsulfone, sold under the trade name D-8 by Summit Specialty Corporation, in 70.82 parts water. The dispersion was ground with a sand mill into an average particle size of about 1 μm.

Preparation of Dispersion B

A second dispersion was prepared with 74 parts water, 1 part sodium polymethacrylate dispersing agent sold under the trade name Darvan-7 by R. T. Vanderbilt Co. (Norwalk, Conn.), 54.95 parts kaolin clay, sold under the trade name Hydrite PX by Dry Branch Kaolin Company (Dry Branch, Ga.), and 54.95 parts aluminum trihydrate sold under the trade name Hydral-710 by Aluminum Company of America (Pittsburgh, Pa.).

Preparation of Dispersion C

A third dispersion was made with 40.7 parts of a 10% solution of polyvinyl alcohol in water, 36.63 parts 3-isopentylethylamnio-6-methyl-7-anilinofluoran dye sold under the trade name S-205 by Nagase America Corporation (New York, N.Y.), and 24.42 parts water.

A final coating mixture was then prepared by mixing in the following order 315.73 parts of the 15% polymer solution, 4.44 parts aziridine crosslinker sold under the trade name Ionic Pfaz322 by Sybron Chemicals Inc. (Birmingham, N.J.), 331.67 parts Dispersion A, 185 parts Dispersion B, and finally, 101.75 parts Dispersion C.

The coating mixture was coated onto the surface of high quality paper and dried to form a heat sensitive layer having a dried weight of 3 lb/3000 ft$^2$ and was then calendared at a pressure of 1000 lb/linear in$^2$.

EXAMPLE 2

Coating and Record Material with
Methylmethacrylate/Ethylacrylate/Methacrylic Acid
Polymer and 1,2 Bis(3,4-Dimethylphenyl)Ethane
Sensitizer A recording material was prepared as in Example 1 in the same manner and with the same components, except that the stearamide in Dispersion A was replaced with the sensitizer 1,2 bis(3,4-dimethylphenyl)ethane. The 1,2 bis(3,4- dimethylphenyl)ethane was ADK ARKLS Y-7 1,2 bis(3,4-dimethylphenyl)ethane obtained from Adeka (Tokyo, Japan).

EXAMPLE 3

Coating and Record Material With Methylmethacrylate/Ethylacrylate/Methacrylic Acid Polymer and Di-P-Methylbenzyl Oxalate Sensitizer A recording material was prepared as in Example 1 in the same manner and with the same components, except that the stearamide in Dispersion A was replaced with the sensitizer di-p-methylbenzyl oxalate. The di-p-methylbenzyl oxalate was obtained from DIC (Tokyo, Japan).

EXAMPLE 4

Coating and Record Material With Methylmethacrylate/Ethylacrylate/Methacrylic Acid Polymer and P-Terphenyl Sensitizer.

A recording material was prepared as in Example 1 in the same manner and with the same components, except that the stearamide in Dispersion A was replaced with the sensitizer p-terphenyl obtained from Aldrich (Milwaukee, Wis.).

EXAMPLE 5

Coating and Record Material With Methylmethacrylate/N-Butnlmethacrylate/ Methacrylic Acid Polymer and Stearamide Sensitizer A recording material was prepared as in Example 1 in the same manner and with the same components, except that the methylmethacrylate/ethylacrylate/methacrylic acid polymer was replaced with a polymer of methylmethacrylate/n-butylmethacrylate/methacrylic acid with weight ratios of 70/5/25 respectively. This polymer was prepared by dispersion polymerization according to standard methods known in the art.

EXAMPLE 6

Comparative Example With Polyvinyl Alcohol

A recording material was prepared as in Example 1 in the same manner and with the same components, except that the methylmethacrylate/ethylacrylate/methacrylic acid polymer was replaced with polyvinyl alcohol. The recording material was further coated with a protective overcoat consisting of 90 parts water, 4.2 parts polyvinyl alcohol, 0.7 parts fumaric acid, 0.6 parts melamine-formaldehyde resin sold under the trade name Cymel-385 from Cytec, and 4.5 parts aluminum hydrate. The protective coating was applied over the heat sensitive coating at a dried weight of 3 lb/3000 ft$^2$ and was then calendared at a pressure of 1000 lb/linear in$^2$.

The recording materials of Examples 1–6 were thermally activated and tested on both imaged and non-imaged portions of the recording materials for water and oil repellence which is indicated by the contact angle of oil and water with the recording material surface and wetting. The contact angle θ is the angle at which a liquid droplet contacts a surface. θw is the contact angle of water with the recording media and θo is the contact angle of the oil with recording media. The oil and water wetting test was performed by vertically immersing a strip of the recording material in oil or water at ambient temperature for about 10 seconds and then immediate removal. If a residual film of liquid remained on the recording material surface, a "yes" was reported for that material.

Cottonseed oil was used for both the oil contact angle and oil wetting results in Table 1 which are reported in degrees. The tests were run for both the imaged and non-imaged recording materials of Examples 1–6.

Table 1 demonstrates the improved water and oil repellence of imaged portions of the recording materials of Examples 1–5 relative to non-imaged portions of these recording materials. This is reflected in the increase in contact angle of water and oil on the recording material surface and the change in oil and water wetting properties. Table 1 also demonstrates that the imaged and non-imaged portions of the recording material of comparative Example 6 do not exhibit different water and oil repelling properties.

Good wetting properties are generally not desirable for recording materials because oil and water typically damage or degrade the coating and any image resulting from thermal activation. However, Table 1 demonstrates that the recording materials of the present invention exhibit improved oil and water repelling properties on the imaged portions relative to the non-imaged portions of these recording materials, while the recording material of comparative Example 6 does not exhibit this difference in repelling properties between imaged and non-imaged areas. While not wishing to be confined to any particular theory, it is believed that the improved resistance of the recording materials of the present invention to water and oil damage is due in part to this difference in water and oil repelling properties between imaged and non-imaged properties. It is thought that oil and water are repelled from the imaged portions onto the adjacent non-imaged portions of the recording material of the present invention, thus protecting the imaged portion from damage and degradation by the oil and water. In contrast, the recording material of comparative Example 6 does not exhibit this difference in repelling properties between the imaged and non-imaged properties, and thus does not exhibit improved resistance to oil and water.

TABLE 1

Water and Oil Repelling Properties

|  | θw | θo | Oil Wetting | Water Wetting |
|---|---|---|---|---|
| Example 1 |  |  |  |  |
| Not Imaged | 55 | 16 | Yes | Yes |
| Imaged | 102 | 61 | No | No |
| Example 2 |  |  |  |  |
| Not Imaged | 49 | 14 | Yes | Yes |
| Imaged | 90 | 52 | No | No |
| Example 3 |  |  |  |  |
| Not Imaged | 68 | 9 | Yes | Yes |
| Imaged | 95 | 51 | No | No |
| Example 4 |  |  |  |  |
| Not Imaged | 42 | 9 | Yes | Yes |
| Imaged | 76 | 62 | No | No |
| Example 5 |  |  |  |  |
| Not Imaged | 65 | 16 | Yes | Yes |
| Imaged | 83 | 55 | No | No |
| Example 6 |  |  |  |  |
| Not Imaged | 44 | 13 | Yes | Yes |
| Imaged | 43 | 12 | Yes | Yes |

Table 2 demonstrates improved environmental resistance to water, oil, ethanol, abrasion in the presence of water, and scratch/scuff resistance for the recording material of Example 1 as compared to the recording material of comparative Example 6. Optical density (OD) was measured at 0.342 mJ using standard methods. Optical density is the degree of opacity of a translucent medium expressed by log Io/I, where Io is the intensity of the incident ray and I is the intensity of the transmitted ray. After thermal activation, optical density was measured for the recording materials of Examples 1 and 6. The optical density was again measured after a 24 hour water soak test and after a 24 hour cottonseed oil smear test to determined the percentage of optical density retained. The recording materials were also evaluated for smear on a bar-code image subsequent to the 24 hour oil smear test, for wet rub resistance, after a 16 hour soak in a 15% ethanol solution, and for scratch/scuff resistance. These tests are well known to those skilled in the art.

TABLE 2

Environmental Testing Results

| Test | Example 1 | Example 6 |
| --- | --- | --- |
| Optical Density (OD) | 1.47 | 1.45 |
| % OD retained after 24 hour water soak | 91.9% | 83.6% |
| % OD retained after 24 oil soak | 92.6% | 79.1% |
| Smear on bar-code after 24 oil soak | excellent | fair |
| Wet rub resistance | excellent | fair |
| 16 hour 15% Ethanol Soak Test | very good | fair |
| Scratch/Scuff Resistance | excellent | fair |

The invention may be embodied in other specific forms without departing from the spirit or essential characteristics thereof. The foregoing embodiments are therefore to be considered in all respects illustrative rather than limiting on the invention described herein. Scope of the invention is thus indicated by the appended claims rather than by the foregoing description, and all changes that come within the meaning and range of equivalency of the claims are intended to be embraced therein.

Each of the patent documents and scientific publications disclosed hereinabove is incorporated by reference herein.

What is claimed is:

1. An environmentally resistant heat sensitive coating comprising:

a color former selected from the group consisting of fluorans, thiofluoranes, spiropyrans, triarylmethanes, xanthenes, and methynes;

a color developer; and an acrylate polymer of the formula:

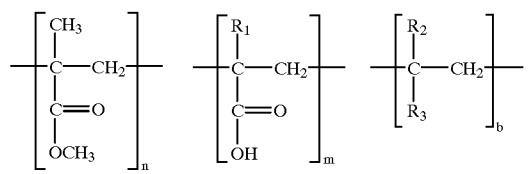

wherein $R_1$ is a hydrogen or a methyl group, $R_2$ is a hydrogen or a methyl group, and $R_3$ is nitrile or chlorine or

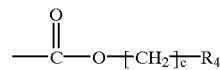

wherein, when c is 0, $R_4$ is methyl, phenyl, or substituted phenyl, and when c is greater than 0, $R_4$ is methyl, phenyl, substituted phenyl, halogen, nitrite or hydroxyl;

m is greater than 1;

n is greater than 1;

b is greater than or equal to 0; and c is an integer from 0 to 38.

2. The coating of claim 1 wherein the acrylate polymer is soluble in an alkaline aqueous solution.

3. The coating of claim 1 wherein the acrylate polymer is selected from the group consisting of methylmethacrylate/ethylacrylate/methacrylic acid polymers, methylmethacrylate/n-butylmethacrylate/methacrylic acid polymers, methylmethacrylate/methylacrylate/methacrylic acid polymers, methylmethacrylate/hydroxyethylmethacrylate/methacrylic acid polymers, methylmethacrylate/hydroxypropylmethacrylate/methacrylic acid polymers, and methylmethacrylate/propylacrylate/methacrylic acid polymers.

4. The coating of claim 1 further comprising an organic sensitizer selected from the group consisting of polyaromatic waxes, methylbenzyl oxalates, terphenyls, benzobiphenyls, fatty acids, fatty acid esters, fatty amides, fatty acid salts, polyethylene, dimethylphenyl ethane, carnauba waxes, microcrystalline waxes, and carboxy-modified paraffin waxes.

5. The coating of claim 1 further comprising a crosslinking agent suitable for use with polymers containing functional carboxylic acid groups.

6. The coating of claim 5 wherein the crosslinking agent is selected from the group consisting of aziridine, epichlorohydrine, zinc oxide, and ammonium zirconium carbonate.

7. The coating of claim 1 further comprising a color developer selected from the group consisting of 4,4'-isopropylidenediphenol, 4,4"-diphenolsulfoxide and benzyl p-hydroxybenzoate, and phenol oligomers.

8. The coating of claim 1 further comprising a filler selected from the group consisting of silica, zinc oxide, aluminum hydroxide, kaolin clay, talc, calcium carbonate, nylon powder, and polyethylene powder.

9. The coating of claim 1 wherein the color former is a fluoran.

10. The coating of claim 1 wherein the color former is a thiofluorane.

11. The coating of claim 1 wherein the color former is a spiropyran.

12. The coating of claim 1 wherein the color former is a triaytmethane.

13. The coating of claim 1 wherein the color former is a xanthene.

14. The coating of claim 1 wherein the color former is a methyne.

15. An environmentally resistant heat sensitive recording material comprising:

a substrate; and a heat sensitive coating comprising:

a color former selected from the group consisting of fluorans, thiofluoranes, spiropyrans, triarylmethanes, xanthenes, and methynes;

a color developer; and
an acrylate polymer of the formula:

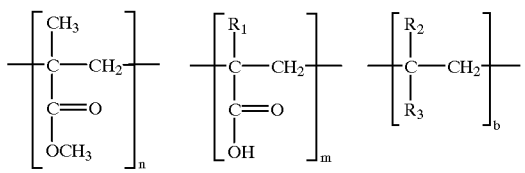

wherein $R_1$ is a hydrogen or a methyl group, $R_2$ is a hydrogen or a methyl group, and $R_3$ is nitrile or chlorine or

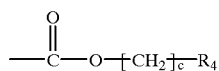

wherein, when c is 0, $R_4$ is methyl, phenyl, or substituted phenyl, and when c is greater than 0, $R_4$ is methyl, phenyl, substituted phenyl, halogen, nitrile or hydroxyl;
m is greater than 1;
n is greater than 1;
b is greater than or equal to 0; and
c is an integer from 0 to 38.

16. The recording material of claim 15 wherein the acrylate polymer is soluble in an alkaline aqueous solution.

17. The recording material of claim 15 wherein the acrylate polymer is selected from the group consisting of methylmethacrylate/ethylacrylate/methacrylic acid polymers, methylmethacrylate/n-butylmethacrylate/methacrylic acid polymers, methylmethacrylate/methylacrylate/methacrylic acid polymers, methylmethacrylate/hydroxyethylmethacrylate/methacrylic acid polymers, methylmethacrylate/hydroxypropylmethacrylate/methacrylic acid polymers, and methylmethacrylate/propylacrylate/methacrylic acid polymers.

18. The recording material of claim 15 further comprising an organic sensitizer selected from the group consisting of polyaromatic waxes, methylbenzyl oxalates, terphenyls, benzobiphenyls, fatty acids, fatty acid esters, fatty amides, fatty acid salts, polyethylene, dimethylphenyl ethane, carnauba waxes, microcrystalline waxes, and carboxy-modified paraffin waxes.

19. The recording material of claim 15 further comprising a crosslinking agent suitable for use with polymers containing functional carboxylic acid groups.

20. The recording material of claim 19 wherein the crosslinking agent is selected from the group consisting of aziridine, epichlorohydrine, zinc oxide, and ammonium zirconium carbonate.

21. The recording material of claim 15 further comprising a color developer selected from the group consisting of 4,4'-isopropylidenediphenol, 4,4"-diphenolsulfoxide and benzyl p-hydroxybenzoate, and phenol oligomers.

22. The recording material of claim 15 further comprising a filler selected from the group consisting of silica, zinc oxide, aluminum hydroxide, kaolin clay, talc, calcium carbonate, nylon powder, and polyethylene powder.

23. The recording material of claim 10 wherein the color former is a fluoran.

24. The recording material of claim 10 wherein the color former is a thiofluorane.

25. The recording material of claim 10 wherein the color former is a spiropyran.

26. The recording material of claim 10 wherein the color former is a triarylmethane.

27. The recording material of claim 10 wherein the color former is a xanthene.

28. The recording material of claim 10 wherein the color former is a methyne.

29. A method of making an environmentally resistant heat sensitive recording comprising:
(a) providing a heat sensitive coating comprising:
a color former selected from the group consisting of fluorans, thiofluoranes, spiropyrans, triarylmethanes, xanthenes, and methynes;
a color developer; and
an acrylate polymer of the formula:

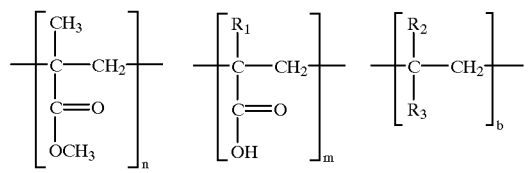

wherein $R_1$ is a hydrogen or a methyl group, $R_2$ is a hydrogen or a methyl group, and $R_3$ is nitrite or chlorine or

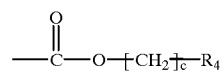

wherein, when c is 0, $R_4$ is methyl, phenyl, or substituted phenyl, and when c is greater than 0, $R_4$ is methyl, phenyl, substituted phenyl, halogen, nitrile or hydroxyl;
m is greater than 1;
n is greater than 1;
b is greater than or equal to 0; and
c is an integer from 0 to 38;
(b) coating a substrate with the heat sensitive coating; and
(c) thermally activating the heat sensitive coating.

30. The method of claim 1 wherein the acrylate polymer is soluble in an alkaline aqueous solution.

* * * * *